United States Patent
Goodwin et al.

(10) Patent No.: US 7,246,130 B2
(45) Date of Patent: Jul. 17, 2007

(54) JOURNALLING NON-NAVIGATION ACTIVITY IN A NAVIGATION-BASED APPLICATION

(75) Inventors: Margaret Goodwin, Lynnwood, WA (US); Mark A. Alcazar, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 451 days.

(21) Appl. No.: 10/782,052

(22) Filed: Feb. 19, 2004

(65) Prior Publication Data

US 2005/0187970 A1    Aug. 25, 2005

(51) Int. Cl.
*G06F 17/30* (2006.01)

(52) U.S. Cl. .......................... 707/101; 707/10; 707/102

(58) Field of Classification Search ................ 707/204, 707/101, 102, 10; 715/513
See application file for complete search history.

(56) References Cited

U.S. PATENT DOCUMENTS

| 6,018,619 | A | 1/2000 | Allard et al. |
| 6,052,716 | A | 4/2000 | Gibson |
| 6,243,091 | B1 | 6/2001 | Berstis |
| 6,557,038 | B1 | 4/2003 | Becker et al. |
| 6,633,316 | B1 | 10/2003 | Maddalozzo, Jr. et al. |
| 6,667,751 | B1 | 12/2003 | Wynn et al. |
| 6,668,338 | B1 | 12/2003 | Todd et al. |
| 2002/0016830 | A1* | 2/2002 | Nicolai ....................... 709/219 |
| 2002/0075321 | A1* | 6/2002 | Sakatani ..................... 345/814 |
| 2003/0120762 | A1* | 6/2003 | Yepishin et al. ............ 709/223 |
| 2004/0015483 | A1* | 1/2004 | Hogan ............................ 707/3 |
| 2004/0133563 | A1* | 7/2004 | Harvey et al. ................. 707/3 |
| 2004/0205574 | A1* | 10/2004 | Sayers et al. ................ 715/513 |

* cited by examiner

*Primary Examiner*—John Cottingham
*Assistant Examiner*—Kuen S. Lu (57) ABSTRACT

The mechanisms and techniques described in this document are directed to a journal that allows a navigation-based application to store and restore state of a resource that is programmatically altered. A resource may invoke code that creates and stores an entry in the journal. The entry includes sufficient information to restore the resource from one state to its prior state. In addition, the entry includes a mechanism for creating another entry to undo any changes made by the first entry. In this manner, the journal includes both entries that identify navigations from one resource to another, and entries may be added to undo changes to a resource to restore the resource to a prior state.

28 Claims, 8 Drawing Sheets

JOURNALLING NON-NAVIGATION ACTIVITY IN A NAVIGATION-BASED APPLICATION

FIELD OF THE INVENTION

The present invention relates to navigation-based software applications, and more particularly, to a journal of navigations in a navigation-based software application.

BACKGROUND OF THE INVENTION

The term "Web application" or "Web app" is often used to describe a new type of software application that is commonly deployed as multiple Web pages accessible over the Internet. A conventional Web app includes multiple Web pages representing markup-based documents. The Web app may also include scripts or other resources that are accessed through the Web pages. Commonly, the Web app is stored on a Web server and downloaded to a local computer when being used.

For most Web apps, the multiple Web pages and resources are hyperlinked together in such a way that the "business logic" of the Web app is distributed over the multiple resources. Each page is responsible for a portion of the overall business logic, and by navigating from page to page, the user can experience the entire Web app. For the purpose of this document, the term "navigating" refers to causing a hosting environment to retrieve a resource associated with the Web app, such as by activating a hyperlink. Navigating to a resource typically involves navigating away from another resource where the navigated-to resource is the one being retrieved by the hosting environment.

Often, the hosting environment stores a travellog or journal of the resources to which the user has navigated. That log is made available to the user through a "back" button and a "forward" button. These buttons allow the user to easily navigate backward to each of the "locations" (resources) which the user has already visited. In addition, if the user navigates backwards, the forward button allows the user to move forward again in the same path.

Unfortunately, the current technology does not address the situation where the user interacts with a particular resource (e.g., a Web page) and causes that resource to change in a manner that the user would consider a navigation, but in fact the host environment has not moved away from the resource. In other words, some resources (e.g., some Web pages) are sufficiently complex that the user's view of the resource can change enough that the user believes a navigation has occurred even though one has not. However, the log does not include a new entry because the host environment has not experienced an actual navigation. For the purpose of this document, these occurrences are termed "non-navigations" or "navigation-like" activity. This paradox often leaves users puzzled and frustrated.

A superior mechanism for logging user activity in a navigation-based application, such as a Web app, has eluded those skilled in the art.

SUMMARY OF THE INVENTION

The mechanisms and techniques described in this document are directed to a journal that allows a navigation-based application to store and restore state of a resource that is programmatically altered. A resource may invoke code that creates and stores an entry in the journal. The entry includes sufficient information to restore the resource from one state to its prior state. In addition, the entry includes a mechanism for creating another entry to undo any changes made by the first entry. In this manner, the journal includes both entries that identify navigations from one resource to another, and entries may be added to undo changes to a resource to restore the resource to a prior state.

DETAILED DESCRIPTION OF THE PREFERRED EMBODIMENT

What follows is a detailed description of one embodiment of a system for journalling non-navigation related activities to enable a user to easily navigate backward and forward not only through actual distinct resources that the user has visited, but also different states of a resource. It will be appreciated that the invention is not limited to the described embodiments alone, and that alternatives will become apparent to those skilled in the art.

Illustrative Journalling Environment

Figure 1:
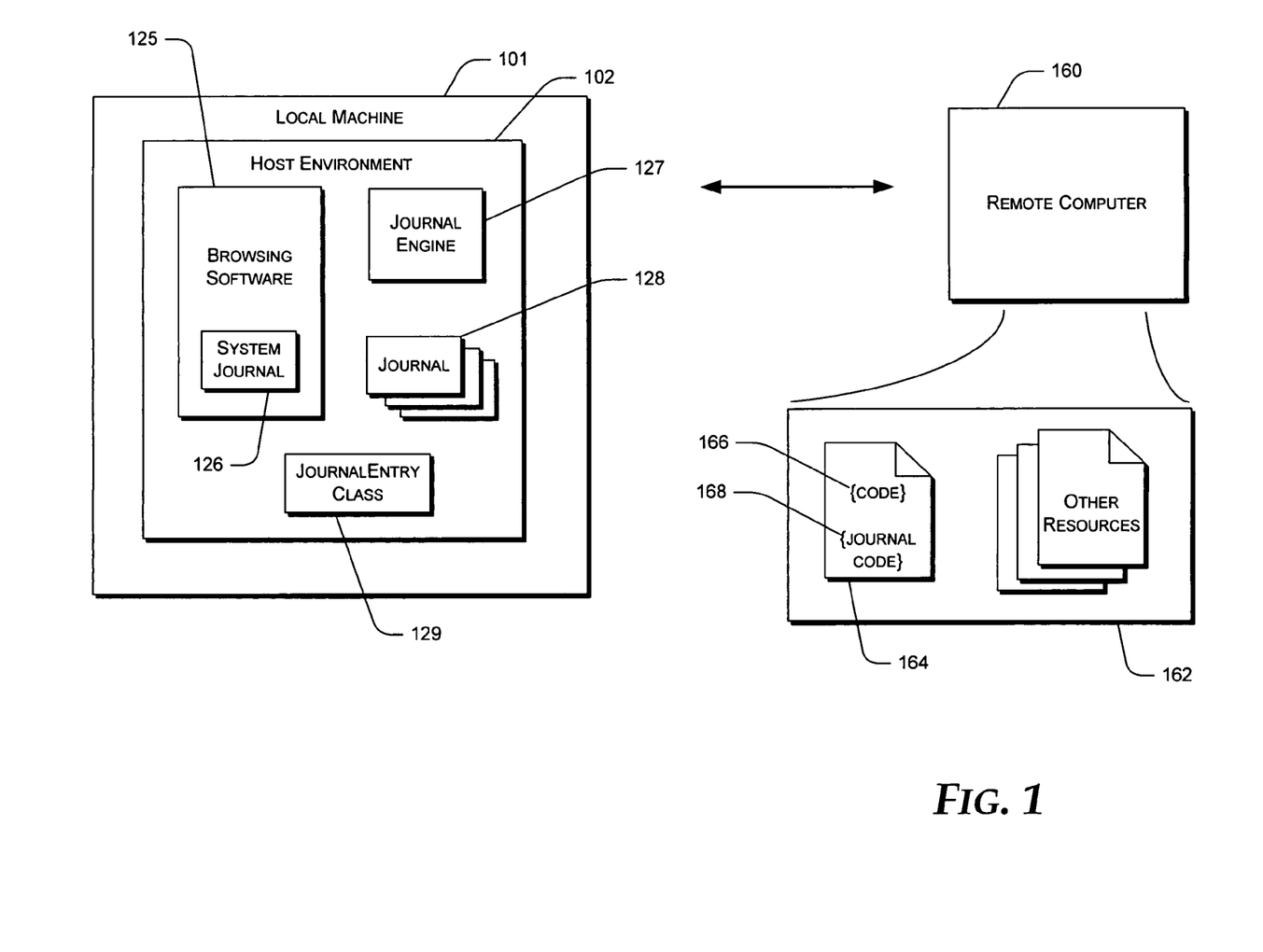
FIG. 1 is a functional block diagram generally illustrating components of a system that implements an embodiment of the invention.

FIG. 1 is a functional block diagram generally illustrating components of a system 100 that implements an embodiment of the invention. In this embodiment, the system 100 includes a local machine 101 and a remote computer 160 connected over a network 161, such as the Internet, an intranet, a wide area network, a local area network, or the like. Generally stated, the local machine 101 allows a user to browse resources, such as Web pages, served by the remote computer 160.

More specifically, the local machine 101 includes mechanisms for retrieving, viewing, and interacting with resources on the remote computer 160. Those mechanisms include browsing software 125 and a journal engine 127 hosted within a hosting environment 102. The browsing software 125 includes components for browsing Web pages and other markup-based resources or the like. The browsing software 125 may be components of an operating system or it may be a stand-alone application.

The journal engine 127 is a component that stores and retrieves information to and from a journal 128, sometimes called a travellog. The journal 128 maintains navigation-related information about locations (e.g., resources) that the user has visited. The journal 128 of this implementation extends the functionality of existing technologies by providing users back/forward access to non-navigation (navigation-like) activity. One example of such non-navigation activity may be significant changes to the same page which would reasonably lead a user to believe a navigation had occurred. The journal engine 127 acts as a layer between the browsing software 125 or any other navigation-related application (e.g., a stand-alone navigation-based application) and the journal 128. The journal engine 127 handles requests to add entries to the journal 128 (such as during a navigation)

and requests to retrieve entries from the journal 128 (such as during a "back" or "forward" operation) from the browsing software 125 or from some other navigation-based application.

For the purpose of this discussion, a "session" is considered to be a series of navigations or navigation-like non-navigation activities that bear some relationship to each other. In one example, a session may correspond to an open browser window instance and include each location, resource, or the like that a user visits while that browser window exists. In another example, a session may correspond to a period during which a user visits resources that are combined as one navigation-based application, regardless of the duration of the browser instance. In other words, a user may interact with multiple "applications" using the same browser instance. Alternatively, a navigation-based application may execute in a stand alone fashion. In that case, a session may correspond to the period during which one or more of the application's windows are open. It should be apparent that other alternative scenarios exist that fit this definition of a session.

The journal engine 127 is configured to maintain at least one journal 128 that includes navigation-related information for a particular browsing session. The journal engine 127 may also create and maintain multiple journals 128 for a session. For example if the session corresponds to an application that uses multiple windows, a separate journal may be created for each window or even, perhaps, for each frame within a window. Alternatively, one journal 128 could be used. For simplicity of discussion only, the journal 128 will be described here in conjunction with a single session. As just mentioned, however, a session may involve multiple journals 128, or the journal 128 could possibly correspond to multiple sessions. A resource, such as a window, may include a public property that identifies a particular journal (e.g., journal 128) that is associated with the resource. In one enhancement, isolation between sessions may be achieved by using one journal per session, window, or even application. In that case, a system journal 126 may also be used to represent session-neutral navigations, where the system journal 126 includes substantially all the navigations that have occurred, but may not be accessible at the application level.

The journal 128 includes entries that identify each location or resource that the user has visited during a session. In addition, the journal engine 127 is configured to create, on demand, additional entries in the journal 128 that may not necessarily correspond to an actual navigation. More precisely, an application (or a resource of the application) may issue an instruction to add an entry in the journal, and include in that entry sufficient information for that the user can navigate back to the particular state that existed when the entry was added. In one specific embodiment, the journal 128 may be an instance of a class having methods substantially as follows:

```
class Journal
{
    public void AddEntry ( JournalEntry journalEntry );
    public JournalEntry RemoveEntry ( int offset );
}
```

As shown, the class has two methods: a RemoveEntry method and an AddEntry method. These two methods may operate in substantially the following manner:

| AddEntry | |
|---|---|
| Method | public void AddEntry (JournalEntry journalEntry) |
| Description | This method is used to add a JournalEntry to the Journal. |
| Parameter | journalEntry - Instance of a class derived from the JournalEntry class. The object is saved in the Journal. When it is popped from the Back or Forward stack, its Replay method invoked. |

| RemoveEntry | |
|---|---|
| Method | public JournalEntry RemoveEntry (int offset) |
| Description | This method is used to remove a JournalEntry at a given offset from the Journal. The removed JournalEntry object is returned. |
| Parameter | offset - The offset in the Back stack at which to remove an entry. A value of 1 removes the entry at the top of the stack. A value of two removes the entry before the last one, etc. |
| Return Value | The JournalEntry that was removed from the stack. |

Note that these two illustrative methods refer to a JournalEntry object, which is an instance of the JournalEntry class 129. In this illustrative implementation, the JournalEntry class 129 is a base class that includes the fundamental information needed to create an entry in the journal 128. A developer may create a custom class that derives from the JournalEntry class 129 to add functionality that creates and replays a custom journal entry. The base JournalEntry class 129 may take substantially the following form:

```
[Serializable]
class JournalEntry
{
    public String Name {get;set}
    public virtual JournalEntry Replay ( INavigator navigator );
}
```

The base JournalEntry class 129 has a method named Replay that takes as a parameter an interface on the container (e.g., Browser window, or frame) that hosts the resource with which the Journal entry is associated. The container provides a reference to the root element of the tree that's currently hosted within it. Programmatic changes to the resource are made by manipulating the tree. The derived class can use the Replay method to perform arbitrary operations on the tree to restore it to its previous state. The derived class can contain whatever properties or methods are necessary to store and replay the state changes. In other words, the Replay method of the JournalEntry class is used to handle restoring state if a user attempts to "navigate" back (or forward) to the location/resource with which the entry is associated.

In short, when a journal entry (J1) is replayed, it returns a new journal entry (J2) that undoes whatever action was just performed. Thus, if the journal entry (J1) is being replayed as the result of a Back navigation, the returned journal entry (J2) is placed in a Forward stack. If the user then navigates Forward, the returned journal entry (J2) is replayed, thus restoring the state of the page just prior to the Back navigation. Likewise, when a Forward navigation takes place, the returned journal entry (J2) is placed in the Back stack, so when the user navigates Back, the state of the page can be restored. Preferably, the journal entry returned by the Replay method should perform the inverse of whatever operation that the Replay method performed.

| JournalEntry Property Name | |
|---|---|
| Property | public String Name (get; set;) |
| Description | The name of the journal entry to be displayed in the drop-down list on the Back/Forward buttons. |

| JournalEntry Method Replay | |
|---|---|
| Method | public void Replay (INavigator navigator) |
| Description | This method is used to replay the operations that took place between navigations. |
| Parameter | navigator - The INavigator that owns the Journal the JournalEntry is stored in. |
| Return Value | JournalEntry to add to the Forward stack when Replay is called on a Back navigation, or to the Back stack when Replay is called on a Forward navigation. |

The remote computer 160 includes a plurality of resources 162, Web pages in this example. Although described here as Web pages, it will be appreciated that other resources may be employed equally as well. The resources 162 include at least one resource (Page_A 164) that is configured to take advantages of the mechanisms and techniques described above. Accordingly, the resource (Page_A 164) includes page code 166 that is configured to create or alter the state of the resource. In other words, the page code 166 may be a control or the like that presents the user with a visual representation of something, in one example. The page code 166 is also configured to modify that visual representation based on some stimulus or input, thus putting the resource (Page_A 164) is a second state. Note that this change is programmatic and does not result from a navigation. Journal code 168 is included in the resource (Page_A 164) to cause a journal entry to be created in the event that the state of the resource is changed. The journal code 168 includes sufficient information to configure the journal entry to restore the resource from its altered state to its previous state.

Example of Operation

Figure 2:
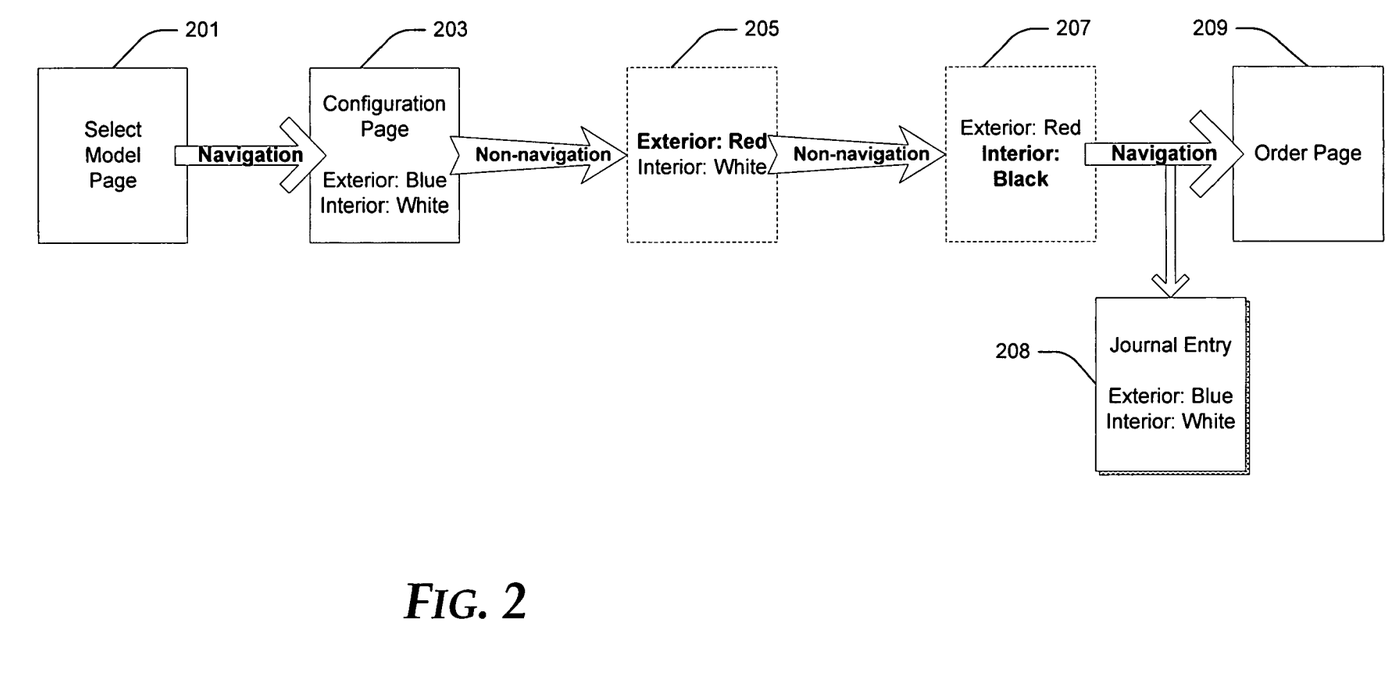
FIGS. 2-5 illustrate various states of an example of the operation of the embodiment illustrated in FIG. 1.

A concrete example of how the embodiment just described performs may benefit the reader. FIGS. 2-5 illustrate the following scenario: Referring first to FIG. 2, a user, Joe, visits an automobile manufacturer's Web site to "virtually" configure a car. Joe begins at a select model page 201, where Joe selects the model he likes. When Joe clicks OK, he navigates to a configuration page 203 for the model he likes. Initially, the configuration page 203 shows a blue car with a white leather interior. On the configuration page 203, Joe clicks on the car and selects red from a color selection palette, thus changing the display of the car to red (state 205). He clicks on the front seat and selects black from the color selection palette. The leather upholstery turns black (state 207). Joe clicks OK, and navigates to the order page 209 to place his order.

In this example, the developer has chosen to make the color changes by programmatically loading a different image rather than by navigating to a new page. For that reason, no journal entry is created by default when Joe selects a new color (i.e., state 203 to state 205 to state 207). However, when Joe clicks OK to navigate to the order page 209, this is an actual navigation, so a journal entry 208 is created automatically. The values stored in the journal entry 208 are likely the default values of many of the controls on the configuration page 203 so when Joe clicks Back from the order page 209, he will probably see the configuration page 203 in its initial state (state 203), not its immediately prior state (state 207). In addition, if the user were to click Back again, the default behavior would be to return to the select model page 201 rather than to the configuration page 203 with any of the user's other color selections. This may leave the user confused and frustrated.

Figure 3:
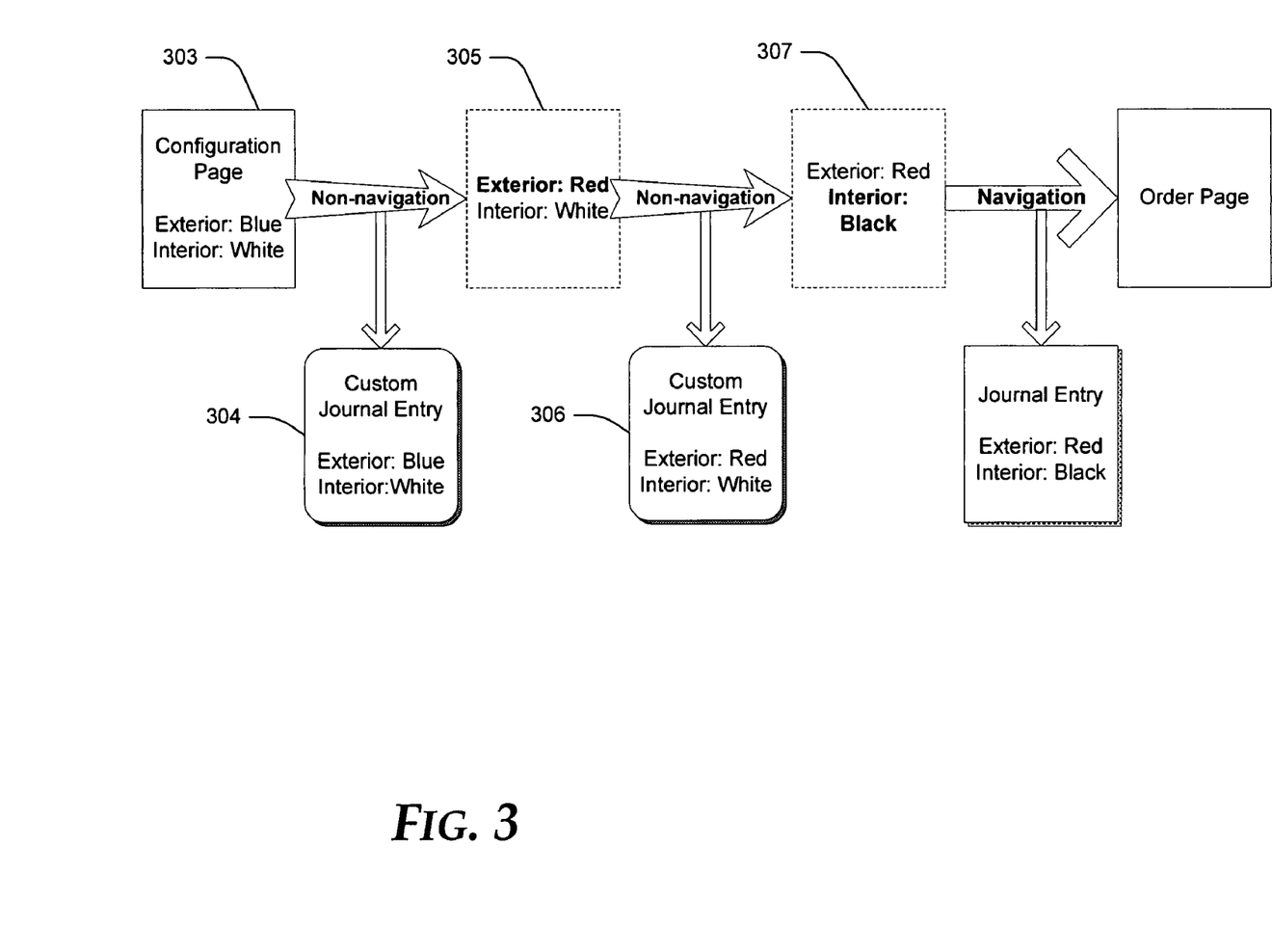

Turning now to FIG. 3, the developer wants customers to be able to use the Back and Forward buttons to review and potentially change the configuration choices they've made. The developer achieves this by adding code to the configuration page 303 that creates a custom journal entry whenever the user makes a selection that changes the appearance of the car on the configuration page 303. For instance, if the car exterior is currently blue, and Joe changes the exterior to red (state 305), the configuration page 303 inserts a journal entry 304 that changes the exterior back to blue (the previous color) if the user subsequently clicks Back from state 305. If Joe changes the upholstery to black (state 307), the developer creates a journal entry 306 that restores the upholstery to white if the user subsequently clicks Back from state 307.

Figure 4:
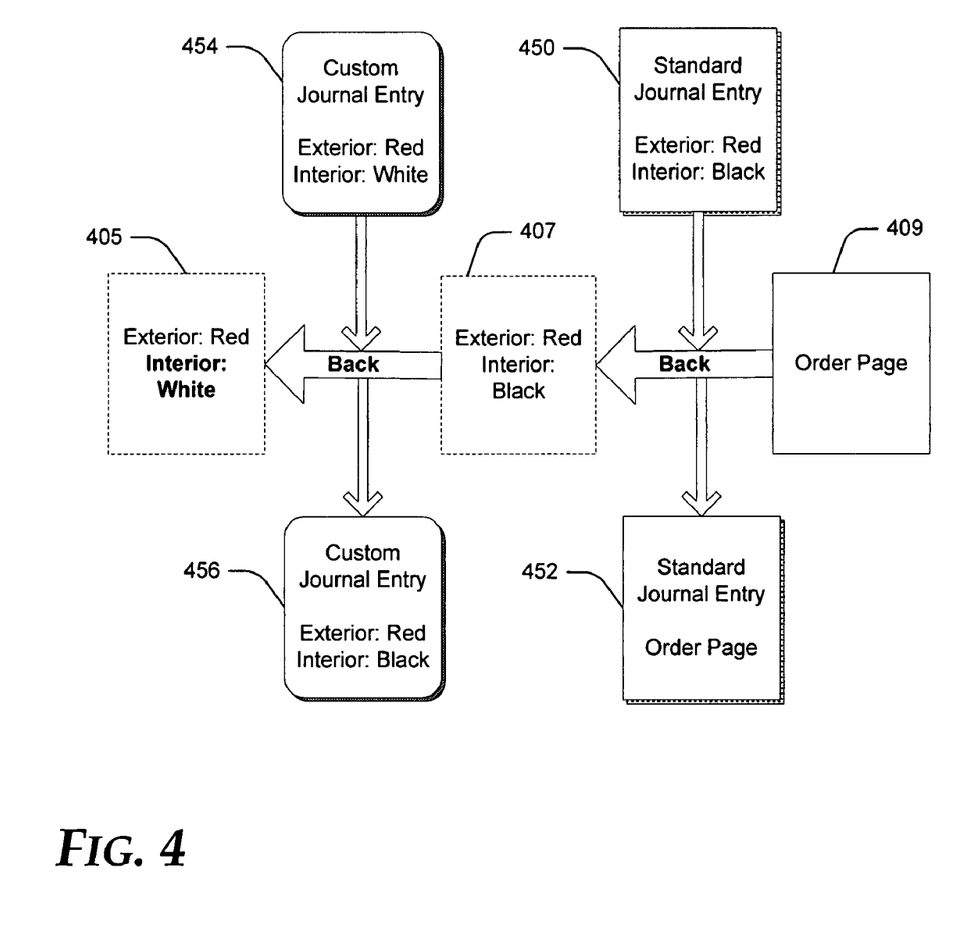

Turning now to FIG. 4, note that the code added to the configuration page to create the custom journal entries may take many forms. In one specific example, assume the configuration page has two ListBox controls, one called ExteriorColor and one called InteriorColor. The OnSelectionChanged handler for those controls might include the following:

```
public void OnSelectionChanged(Object sender,
SelectionChangedEventArgs args) {
    ChooseColorJournalEntry Entry = new
ChooseColorJournalEntry;
        Entry.Name = Pane.Title;
        Color Interior;
        Color Exterior;
        if (ExteriorColor == sender.ID) {
            Entry.Exterior = args.UnSelectedItems[0].
BackgroundColor;
            Exterior = args.SelectedItems[0].BackgroundColor;
        }
        if (InteriorColor == sender.ID) {
            Entry.Interior = args.UnSelectedItems[0].
BackgroundColor;
            Interior = args.SelectedItems[0].BackgroundColor;
        }
        Journal.AddEntry(Entry);
        // change the image to reflect the new color selection
        ...
}
```

Now, when Joe clicks the Back button from the order page 409, the journal entry 450 on the top of the Back stack restores the configuration page to its last known state (state 407). At this point, a journal entry 452 for the order page 409 is automatically pushed onto the Forward stack, so if Joe clicks Forward, he will return to the order page 409.

If Joe clicks Back yet again, however, the custom journal entry 454 is popped from the top of the Back stack, and its Replay method is invoked. The data to restore the previous state (state 405) was added to the custom journal entry 454 by the code shown above. Now, the Replay method uses that data to programmatically change the state on the page to restore it to state 405. At the same time, a new custom journal entry 456 is created and pushed onto the Forward stack to undo the changes just made by the current journal entry 454 if the user clicks Forward from state 405. The Replay method creates this new Journal entry 456, which it returns, and the framework (e.g., the journal engine 127) automatically pushes it onto the Forward stack. The custom JournalEntry class used in this example might look like this:

```
class ChooseColorJournalEntry : JournalEntry
{
    Color Exterior;
    Color Interior;
    public virtual JournalEntry Replay ( INavigator navigator
)
    {
        ChooseColorJournalEntry ReverseEntry = new ChooseColorJournalEntry;
        ReverseEntry.Name = Name;
        UIElement content = navigator.Content;
        Element ExteriorColor = Findelement(content, "ExteriorColor");
        ReverseEntry.Exterior = ExteriorColor.Color;
        ((ListBox)ExteriorColor).SelectedItem.Color = Exterior;
        Element InteriorColor = Findelement(content, "InteriorColor");
        ReverseEntry.Interior = InteriorColor.Color;
        ((ListBox)InteriorColor).SelectedItem.Color = Interior;
        Return ReverseEntry;
    }
    Element FindElement(Element root, String name)
    {
        Element found;
        foreach (Element elem in root.Elements)
        {
            if (name == elem.ID)
                found = elem;
            else
                found = FindElement(elem, name);
            return found;
        }
    }
}
```

Figure 5:
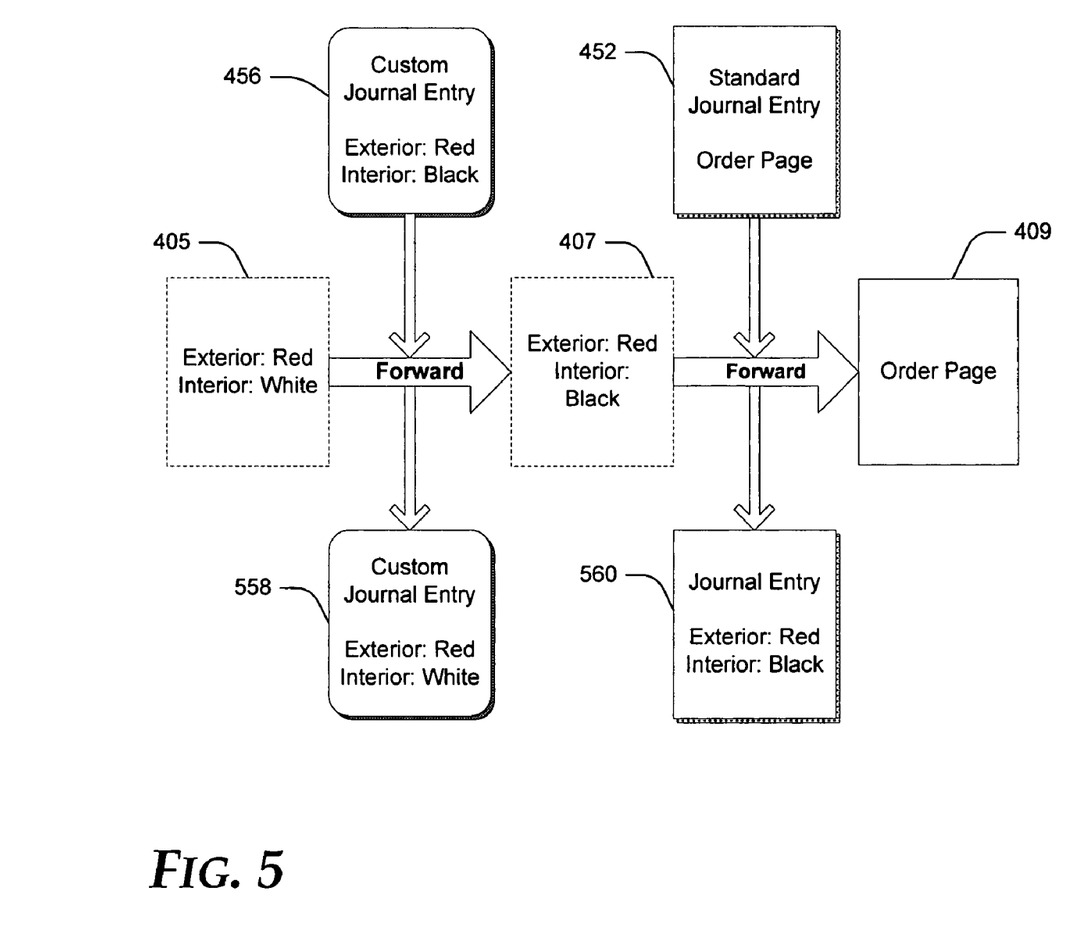

Referring now to FIG. 5, if Joe clicks Forward from state 405, the custom journal entry just pushed onto the Forward stack (entry 456) is retrieved, and its Replay method is invoked. This restores the page to state 407, as it was before the user clicked Back. Another new journal entry 558, returned by the Replay method of entry 456, is pushed onto the top of the Back stack. If Joe clicks Forward again, the journal entry 452 that was pushed onto the Back stack when he clicked Back from the Order page 409 is popped, that page is navigated to, and another new journal entry 560 is pushed onto the Back stack for the previous page (state 407).

Generalized Operation of this Embodiment

Figure 6A:
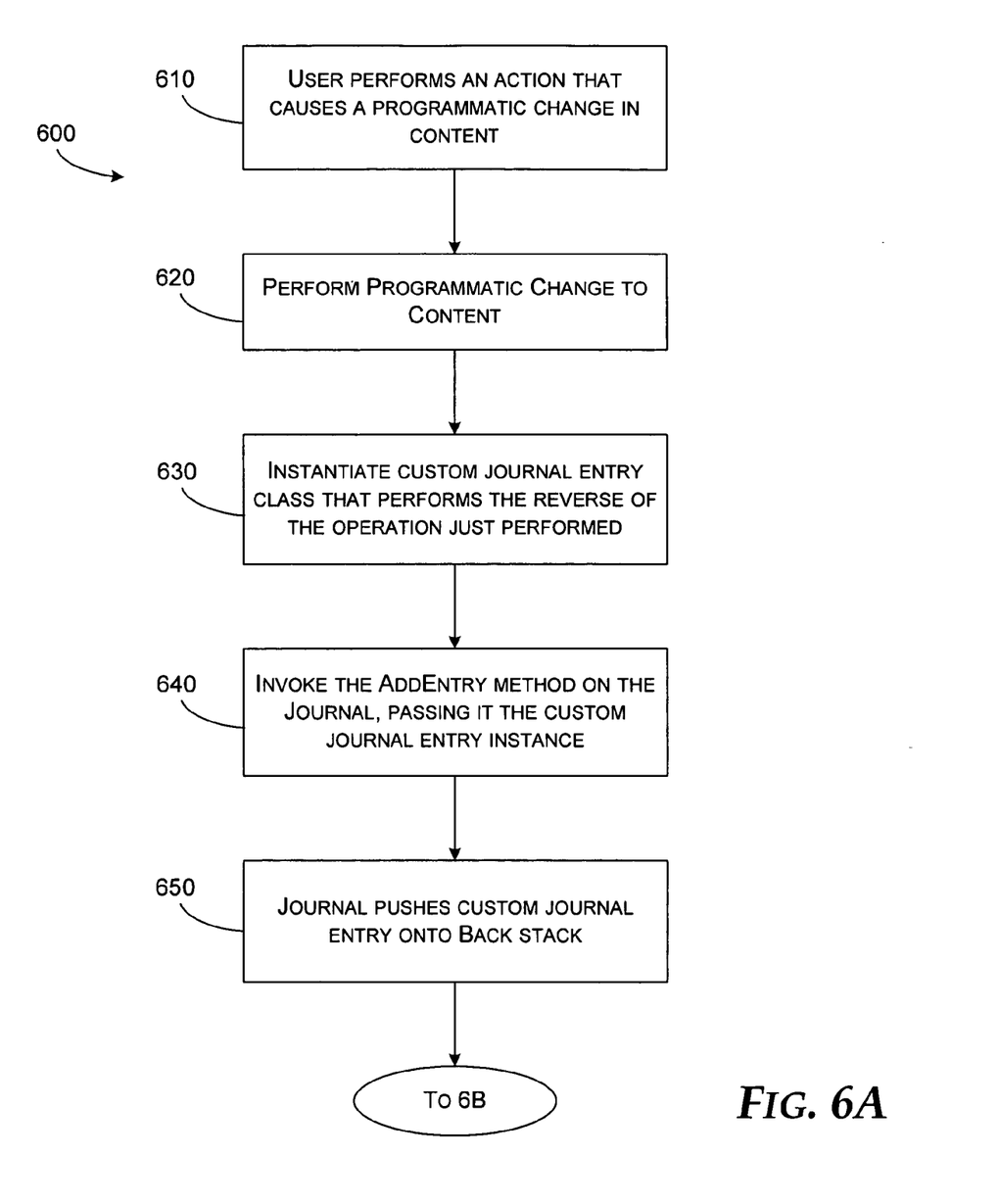
FIGS. 6A and 6B are a logical flow diagram generally illustrating steps in a process for journalling non-navigation activity in a navigation-based application.

FIG. 6 is a logical flow diagram generally illustrating steps in a process for journalling non-navigation activity in a navigation-based application. Beginning with FIG. 6A, the process 600 begins at block 610 when a user performs an action that causes a programmatic change to content on a resource that a developer wishes to make available should the user attempt to return. For example, the user may be interacting with a Web page that includes controls or other functions that alter the display of the Web page in response to certain user input. At block 620, the programmatic change is performed.

At block 630, a new journal entry is instantiated and configured to perform the reverse of the operations just performed. In other words, a new, custom journal entry is created to undo what was just done at block 620. At block 640, an AddEntry method on the journal associated with the container (e.g., window or browser) that hosts the resource is invoked and passed the new journal entry. The operation causes the new journal entry to be added to the appropriate journal stack at block 650, such as the Back stack or Forward stack.

Figure 6B:
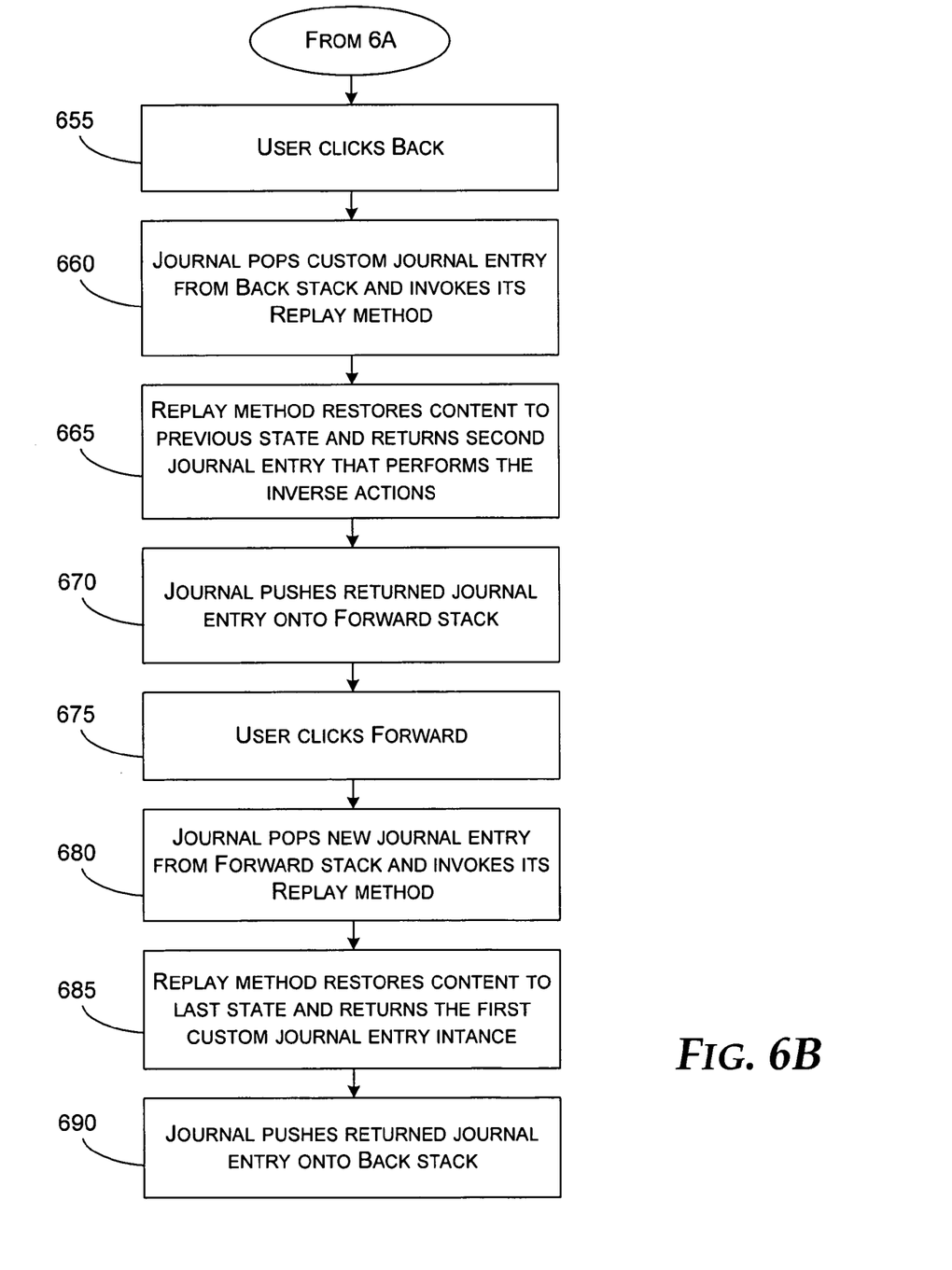

Turning now to FIG. 6B, at block 655 the user attempts to return to the state at which the resource existed in block 610, such as by clicking a Back button or the like. At block 660, the journal engine pops the custom journal entry from the back stack and invokes its Replay method. As mentioned, the Replay method includes the configuration information to reverse the operations performed earlier. In addition, the Replay method is configured to create another new journal entry (entry 2) to undo the operations currently being performed, which it returns to the caller (e.g., the journal engine). At block 670, the journal engine includes the second new journal entry (entry 2) in the journal by pushing it on the Forward stack.

At block 675, the user may now click the forward button, evidencing an intent to return to the state which was just undone at block 665. At block 680, the journal engine pops the journal entry created at block 665 (entry 2) from the Forward stack and invokes its Replay method. Again, as above, the Replay method is configured to return the state of the resource to the way it was when the journal entry was created, and to create another new journal entry (entry 3). At block 685, the Replay method performs the operations to restore the resource to its previous state, and returns the new journal entry (entry 3). At block 690, the journal engine pushes the journal entry (entry 3) onto the Back stack, thus concluding the process.

Illustrative Computing Environment

Figure 7:
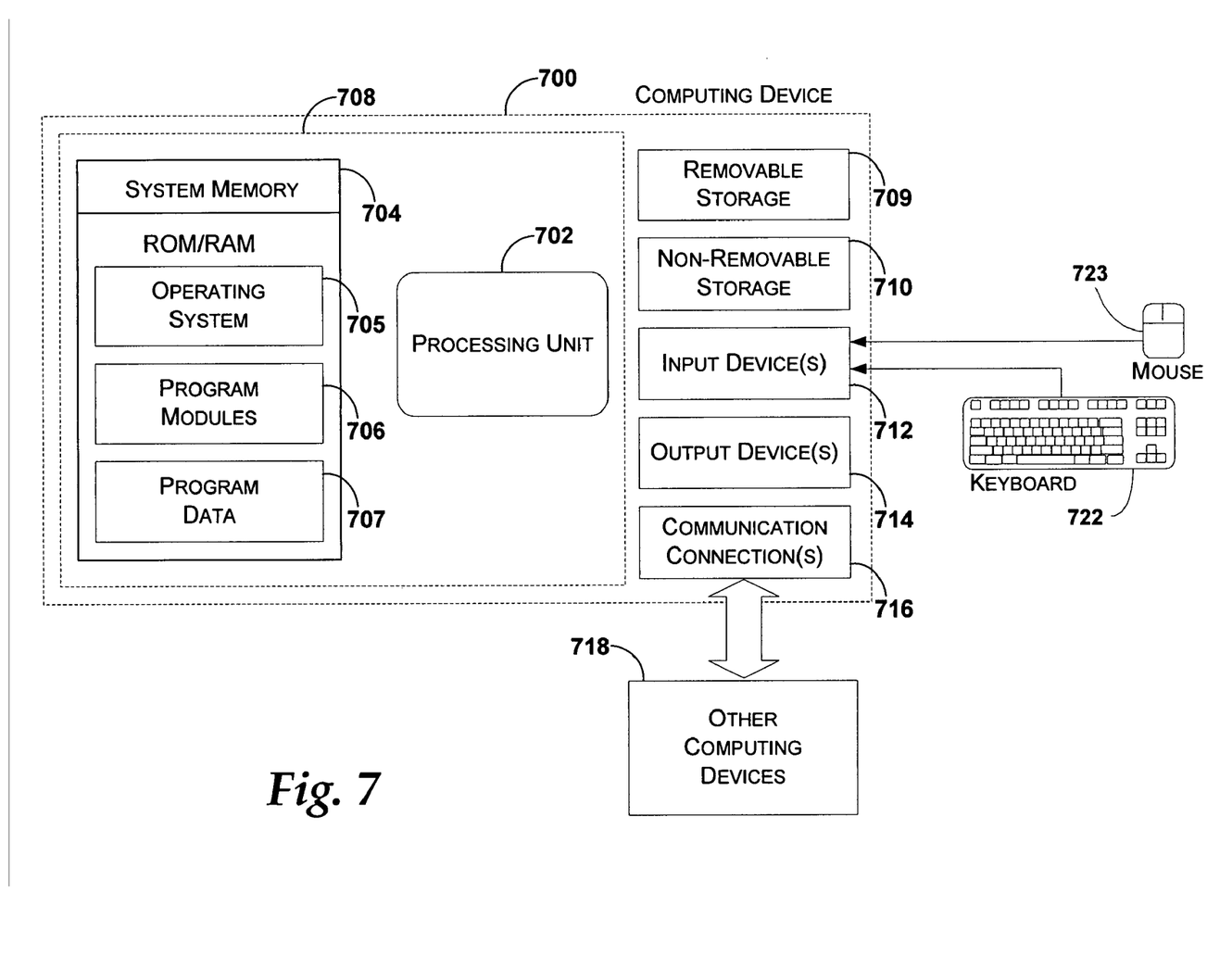
FIG. 7 is a functional block diagram that illustrates a computing device that may be used in implementations of the present invention

FIG. 7 illustrates a computing device that may be used in illustrative implementations of the present invention. With reference to FIG. 7, one exemplary system for implementing the invention includes a computing device, such as computing device 700. In a very basic configuration, computing device 700 typically includes at least one processing unit 702 and system memory 704. Depending on the exact configuration and type of computing device, system memory 704 may be volatile (such as RAM), non-volatile (such as ROM, flash memory, etc.) or some combination of the two. System memory 704 typically includes an operating system 705, one or more program modules 706, and may include program data 707. This basic configuration of computing device 700 is illustrated in FIG. 7 by those components within dashed line 708.

Computing device 700 may have additional features or functionality. For example, computing device 700 may also include additional data storage devices (removable and/or non-removable) such as, for example, magnetic disks, optical disks, or tape. Such additional storage is illustrated in FIG. 7 by removable storage 709 and non-removable storage 710. Computer storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer storage media. Computer storage media includes, but is not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by computing device 700. Any such computer storage media may be part of device 700. Computing device 700 may also have input device(s) 712 such as keyboard 722, mouse 723, pen, voice input device, touch input device, scanner, etc. Output device(s) 714 such as a display, speakers, printer, etc. may also be included. These devices are well known in the art and need not be discussed at length here.

Computing device 700 may also contain communication connections 716 that allow the device to communicate with other computing devices 718, such as over a network. Communication connections 716 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A system for managing changes in state of a navigation-based application, comprising:
   a local computer implemented journal engine for maintaining a journal,
      wherein the journal is associated with a container that navigates to and hosts a resource and the resource includes a mechanism that stores a journal entry in the journal,
      wherein the journal entry includes information about a change in state of the resource and the journal entry restores the resource to the state prior to the change,
      wherein the journal maintains navigation-related information about locations to which a user has navigated and provides users backward and forward access to:
      (1) navigation activities in which the user has navigated backward and forward through distinct resources, and
      (2) activities where a user has not conducted a physical navigation away from a resource but rather has changed a state of a resource,
      wherein the backward and forward access is implemented using stack-based techniques, wherein:
      individual journal entries are replayed to return a new journal entry that undoes a previously-performed action, wherein:
      if the new journal entry is being replayed as a result of a backward navigation, an associated returned journal entry is placed in a forward stack, and
      if the new journal entry is being replayed as a result of a forward navigation, an associated returned journal entry is placed in a back stack.

2. The system recited in claim 1, wherein the change in state of the resource is initiated by input from a user interacting with the resource.

3. The system recited in claim 1, wherein the resource is associated with a navigation-based application.

4. The system recited in claim 2, wherein the navigation-based application comprises a plurality of resources and includes a mechanism for navigating among each of the plurality of resources.

5. The system recited in claim 3, wherein the navigation-based application is browser-hosted.

6. The system recited in claim 3, wherein the navigation-based application is stand-alone.

7. The system recited in claim 1, wherein the resource further includes a mechanism for altering the state of the resource.

8. A plurality of computer executable components embodied on a computer-readable storage medium for managing changes in state of a navigation-based application, the plurality of computer-executable components comprising:
   a resource including a mechanism for altering a state of the resource from a first state to a second state; and
   an instance of a journal entry having a method for restoring the resource from the first state to the second state,
   wherein the method further creates a journal entry to undo the restoration of the resource from the first state to the second state,
   wherein the method adds to a forward stack when the method is called on a back navigation, and adds to a back stack when the method is called on a forward navigation,
   wherein the journal entry comprises part of a Journal that maintains navigation-related information about locations to which a user has navigated and resources whose state has been changed by the user, and provides users backward and forward access to:
   (1) navigation activities in which the user has navigated backward and forward through distinct resources, and
   (2) activities where a user has not conducted a physical navigation away from a resource but rather has changed a state of a resource,
   wherein the backward and forward access is implemented using stack-based navigation techniques, wherein:
   individual journal entries are replayed to return a new journal entry that undoes a previously-performed action, wherein:
   if the new journal entry is being replayed as a result of a backward navigation, an associated returned journal entry is placed in a forward stack, and
   if the new journal entry is being replayed as a result of a forward navigation, an associated returned journal entry is placed in a back stack.

9. The computer-readable storage medium of claim 8, wherein the resource is further configured to cause the journal entry to be added to a journal that includes information about navigations among a plurality of resources.

10. The computer-readable storage medium of claim 8, wherein the resource is a component of the navigation-based application.

11. The computer-readable storage medium of claim 8, wherein the navigation-based application includes a plurality of resources that are hyperlinked together.

12. A data structure embodied on a computer-readable storage medium, the data structure comprising:

a journal entry having a Replay method, wherein the Replay method restores a resource from a first state to a second state, wherein the Replay method further creates a second journal entry to restore the resource from the second state to the first state, wherein the journal maintains navigation-related information about locations to which a user has navigated and provides users backward and forward access to:

(1) navigation activities in which the user has navigated backward and forward through distinct resources, and (2) activities where a user has not conducted a physical navigation away from a resource but rather has changed a state of a resource, wherein the backward and forward access is implemented using stack-based techniques, wherein:

individual journal entries are replayed to return a new journal entry that undoes a previously-performed action, wherein:

if the new journal entry is being replayed as a result of a backward navigation, an associated returned journal entry is placed in a forward stack, and if the new journal entry is being replayed as a result of a forward navigation, an associated returned journal entry is placed in a back stack.

13. The computer-readable storage medium of claim 12, wherein the resource comprises a component of a navigation-based application.

14. The computer-readable storage medium of claim 12, wherein the journal is associated with a window of the navigation based application.

15. The computer-readable storage medium of claim 12, wherein the journal is associated with a session.

16. The computer-readable storage medium of claim 15, wherein the session comprises a browser session.

17. The computer-readable storage medium of claim 15, wherein the session comprises a lifetime of the navigation-based application.

18. A software architecture embodied on a computer-readable storage medium for managing changes in state of a navigation-based application, the storage architecture comprising:

an internal system that supports the maintenance of entries in a journal, wherein the journal maintains state information related to navigations among resources in a navigation-based application; and a set of interfaces that support the inclusion of entries in the journal, wherein the journal entries are related to non-navigation activity, wherein the journal maintains navigation-related information about locations to which a user has navigated and provides users backward and forward access to:

(1) navigation activities in which the user has navigated backward and forward through distinct resources, and (2) activities where a user has not conducted a physical navigation away from a resource but rather has changed a state of a resource, wherein the backward and forward access is implemented using stack-based techniques, wherein:

individual journal entries are replayed to return a new journal entry that undoes a previously-performed action, wherein, if the new journal entry is being replayed as a result of a backward navigation, an associated returned journal entry is placed in a forward stack, and if the new journal entry is being replayed as a result of a forward navigation, an associated returned journal entry is placed in a back stack.

19. The software architecture recited in claim 18, wherein the set of interfaces includes an AddEntry method for adding a journal entry to the journal.

20. The software architecture recited in claim 18, wherein the set of interfaces includes a RemoveEntry method for removing a journal entry from the journal.

21. The software architecture recited in claim 20, wherein the RemoveEntry method is further configured to remove a journal entry from a Back stack portion of the journal.

22. The software architecture recited in claim 18, wherein the set of interfaces is provided by a base class having a Name property that identifies a name of the journal entry in the journal.

23. The software architecture recited in claim 18, wherein the set of interfaces is provided by a base class having a Replay method configured to restore a resource from a first state to a second state.

24. The software architecture recited in claim 23, wherein the Replay method is further configured to create and return a second journal entry for inclusion in the journal.

25. The software architecture recited in claim 24, wherein the second journal entry is configured to restore the resource from the second state to the first state.

26. A computer-readable storage medium encoded with instructions executing on a computer, wherein the instructions perform steps comprising:

receiving a notification to add a journal entry to a journal, wherein the journal entry is associated with a resource and the resource includes information to restore the resource from a first state to a second state, wherein the first state is associated with a first set of characteristics of the resource and the second state is associated with a second set of characteristics of the resource; and adding the journal entry to the journal, wherein the journal maintains navigation-related information about locations to which a user has navigated and provides users backward and forward access to:

(1) navigation activities in which the user has navigated backward and forward through distinct resources, and (2) activities where a user has not conducted a physical navigation away from a resource but rather has changed a state of a resource, wherein the backward and forward access is implemented using stack-based techniques, wherein:

individual journal entries are replayed to return a new journal entry that undoes a previously-performed action, wherein:

if a the new journal entry is being replayed as a result of a backward navigation, an associated returned journal entry is placed in a forward stack, and if the new journal entry is being replayed as a result of a forward navigation, an associated returned journal entry is placed in a back stack.

27. The computer-readable storage medium of claim 26, wherein the journal entry further comprises a mechanism for restoring the resource from the second state to the first state.

28. The computer-readable storage medium of claim 27, wherein the mechanism is configured to create a second journal entry having sufficient information to restore the resource from the second state to the first state.

* * * * *